V. H. HOBSON.
CUSPIDOR.
APPLICATION FILED FEB. 27, 1909.
952,247.
Patented Mar. 15, 1910.
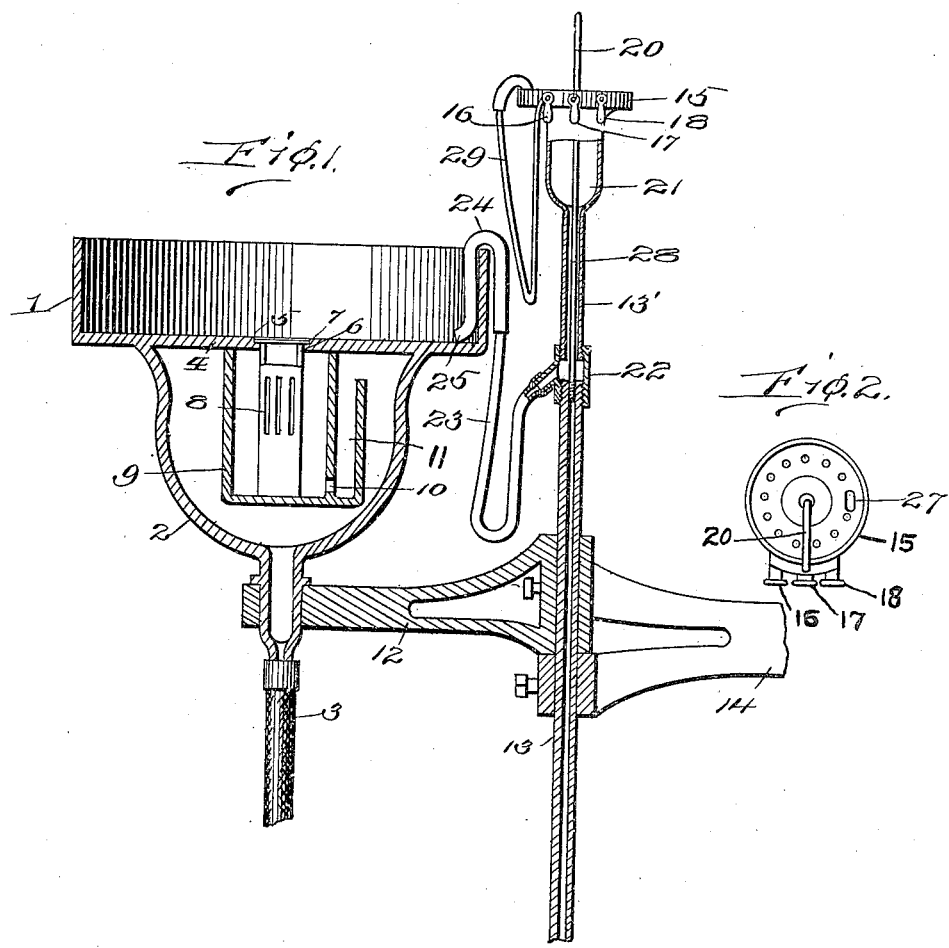
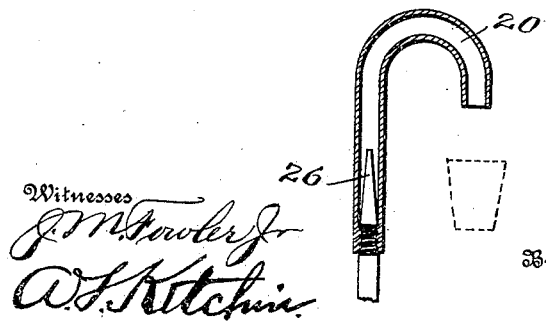

UNITED STATES PATENT OFFICE.

VALENTINE H. HOBSON, OF RICHMOND, KENTUCKY.

CUSPIDOR.

952,247.

Specification of Letters Patent. Patented Mar. 15, 1910.

Application filed February 27, 1909. Serial No. 480,369.

*To all whom it may concern:*

Be it known that I, VALENTINE H. HOBSON, a citizen of the United States, residing at Richmond, in the county of Madison and State of Kentucky, have invented certain new and useful Improvements in Cuspidors; and I do hereby declare the following to be a full, clear, and exact description of the invention, such as will enable others skilled in the art to which it appertains to make and use the same.

This invention relates to improvements in cuspidors, and particularly to cuspidors for use by dentists, and has for an object improved means of maintaining water in the cuspidor, and at the same time catching any foreign matter contained in the water, as for instance, fillings of valuable materials.

Another object of the invention is the arrangement of a standard a comparatively great distance above the cuspidor proper for receiving a glass, the standard being arranged with a plurality of valves for supplying water to the cuspidor, to the saliva siphon, and to a goose-neck for dispensing the water into a glass or as may be desired.

Another object of the invention is the arrangement of a standard for supporting a glass and other attachments for a dental cuspidor formed with a depression for receiving a small amount of water especially adapted to cleaning the tools of the dentist, or wetting the same as desired.

With these and other objects in view the invention comprises certain novel constructions, combinations and arrangement of parts as will be hereinafter more fully described and claimed.

In the accompanying drawings: Figure 1 is a sectional view through a cuspidor embodying the invention, certain parts being shown in full lines. Fig. 2 is a top plan view of the glass supporting standard. Fig. 3 is an enlarged, detail, fragmentary sectional view through the goose-neck water dispensing pipe embodying certain features of the invention.

Referring to the drawing by numerals, 1 indicates the bowl of a cuspidor, and 2 a lower chamber which is designed to receive water from bowl 1, and to direct the same to a pipe 3 from which the same may be discharged at any place desired. The bowl 1 is formed with comparatively thin sides that are not turned over at the top but present a comparatively thin edge so as to lessen the liability of foreign matter catching thereon. The bottom 4 of the bowl 1 is formed preferably level and at right angles to the sides and is formed with a shouldered aperture 5 centrally for accommodating what is known as the gold cup 6 which is merely a receptacle having a flange 7 for engaging the shouldered portion of aperture 5, and body portion slotted at 8. The slots 8 are positioned a considerable distance from the bottom of the receptacle 6 so that as the water and foreign matter enter the cup 6 the same will pass downward into the cup and out apertures 8 with the exception of any solid matter which will pass downward and lodge in the bottom of the cup. The cup is preferably loosely placed in position, and may be easily removed for removing any solid matter deposited therein, as for instance, parts of gold filling, or other valuable material. When the water passes through slots 8 it discharges into a receptacle 9 which is provided with an aperture 10. The water passing from aperture 10 passes upward through passage-way 11 and finally over the top thereof into member 2 from which it passes outward through pipe 3 into the sewer, or any desired place.

The bowl 1 is supported in any desired manner, preferably by a bracket 12 adjustably mounted upon a hollow rod 13 which in turn is supported by a bracket 14. The bracket 14 may be secured to a dental chair or supported in any desired manner. Hollow rod or pipe 13 has secured thereto a glass support 15 at the upper end thereof. Connected with the glass support 15 is a plurality of valves 16, 17 and 18. Valve 16 is preferably arranged to control the flow of water for varying the action of the saliva siphon 29, which consists of any ordinary or preferred form of construction, valve 17 controls the discharge of water through the goose neck dispensing pipe 20, and valve 18 is arranged to discharge directly into the enlargement 21 from which the water passes downward into the upper part 13′ of hollow rod 13, and passes out a Y joint 22 into a flexible hose 23. From hose 23 the water passes through a goose-neck arrangement 24 that is turned outward at 25 for discharging water upon bottom 4 of bowl 1. In ordinary use valve 18 is kept slightly open for supplying a small amount of water continuously to bowl 1 for maintaining the same in a clean, sanitary condition. Any water passing through valve 16 for causing siphon 29 to act will also pass into enlargement 21, and from thence into bowl 1. A goose-neck dispensing pipe 20 is arranged to discharge ordinarily into a glass positioned therebeneath, and if desired the same may be caused to overflow and the overflow passes downward into enlargement 21 and carried from there into bowl 1. In this manner all of the water discharged in glass support 15 will be conveyed to bowl 1 and from thence through pipe 3 to the sewer or any desired location. In order not to cause the water to discharge with too great a force from pipe 20 a reduced nozzle 26 is provided in one end thereof so that it will be necessary to fill pipe 20 full of water by discharging the same from nozzle 26 before any of the water passes from pipe 20.

Formed in the upper surface of glass support 15 is a depression 27 which is designed to contain a small amount of water into which the dentist may dip his tools as occasion may require. In case the water in depression 27 should become foul for any reason the same may be easily cleaned by wiping a cloth therein which will not only remove the water but clean the same. This is practicable as the depression is comparatively small, preferably containing about a half teaspoonful of water, though a greater or less amount could be provided for if desired. In supplying water to depression 27 the same may be taken from pipe 20 or supplied in other desired manner.

Communicating with valves 16, 17 and 18, which control the flow of water to the various attachments secured to support 15, is a pipe 28 which is threaded into hollow rod or pipe 13 and pipe 13 is supplied from any desired source with water.

What I claim is:

1. In a cuspidor for dentists, a bowl, a glass standard positioned above the bowl and formed with a receiving chamber for the glass, surrounded by the outer periphery of the standard, a water receiving chamber formed on the outer periphery of the standard, a water supply pipe connected therewith and adapted to furnish water thereto, a goose-neck pipe leading therefrom and adjusted to discharge water into the standard through the medium of a valve positioned upon the water receiving chamber on the outer periphery of the standard, a receptacle positioned beneath the standard and connected with the bowl, a valve positioned upon the outer periphery of the standard and adapted to discharge water from the water receiving chamber into the receptacle for the purpose of discharging the same into the bowl, a siphon connected with the water receiving chamber by means of a valve carried thereon upon the outer periphery of the standard and means for discharging water from the bowl.

2. In a cuspidor, a bowl formed with an aperture therein, a receptacle positioned below said bowl and in communication with said aperture, a second receptacle fitted into said first mentioned receptacle and having the upper end thereof positioned in said aperture in said bowl and filling the same, said first mentioned receptacle being provided with discharge portions near the top thereof and said second mentioned receptacle being provided with a plurality of discharge openings positioned above the bottom, whereby water and sediment passing from said bowl into said second mentioned receptacle will be permitted a settling action before the same escapes, and means for directing the discharge from said second mentioned receptacle.

In testimony whereof I affix my signature in presence of two witnesses.

VALENTINE H. HOBSON.

Witnesses:
 EDWARD T. FENWICK,
 JOHN L. FLETCHER.